United States Patent
Lee et al.

(10) Patent No.: US 9,086,761 B2
(45) Date of Patent: Jul. 21, 2015

(54) DISPLAY APPARATUS

(75) Inventors: Il Ho Lee, Hwaseong-si (KR);
Hyeonyong Jang, Hwaseong-si (KR);
Seongmo Hwang, Seongnam-si (KR);
Jaejin Pyun, Hwaseong-si (KR);
Yong-Hwi Kim, Asan-si (KR);
Moonjung Baek, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 533 days.

(21) Appl. No.: 13/225,897

(22) Filed: Sep. 6, 2011

(65) Prior Publication Data

US 2012/0162138 A1    Jun. 28, 2012

(30) Foreign Application Priority Data

Dec. 27, 2010 (KR) .................. 10-2010-0135625

(51) Int. Cl.
*G06F 3/042* (2006.01)
(52) U.S. Cl.
CPC ...... *G06F 3/042* (2013.01); *G06F 2203/04109* (2013.01)
(58) Field of Classification Search
CPC .......................................... G06F 3/042
USPC ......................................... 345/173, 175–176
See application file for complete search history.

(56) References Cited

U.S. PATENT DOCUMENTS

| 6,024,476 | A | * | 2/2000 | Wakeman | 362/581 |
|---|---|---|---|---|---|
| 7,081,933 | B2 | * | 7/2006 | Yu et al. | 349/62 |
| 7,444,887 | B2 | | 11/2008 | Yoshida et al. | |
| 2006/0188196 | A1 | * | 8/2006 | Charters et al. | 385/33 |
| 2006/0227120 | A1 | * | 10/2006 | Eikman | 345/175 |
| 2008/0122803 | A1 | | 5/2008 | Izadi et al. | |
| 2008/0151250 | A1 | * | 6/2008 | Kamijima | 356/445 |
| 2008/0284925 | A1 | * | 11/2008 | Han | 349/12 |
| 2009/0033637 | A1 | * | 2/2009 | Han | 345/175 |
| 2009/0128499 | A1 | * | 5/2009 | Izadi et al. | 345/173 |
| 2009/0128508 | A1 | | 5/2009 | Sohn et al. | |
| 2010/0302185 | A1 | * | 12/2010 | Han et al. | 345/173 |
| 2010/0302210 | A1 | * | 12/2010 | Han et al. | 345/175 |
| 2011/0032215 | A1 | * | 2/2011 | Sirotich et al. | 345/175 |

FOREIGN PATENT DOCUMENTS

| KR | 1020070054607 | 5/2007 |
|---|---|---|
| KR | 1020100056117 | 5/2010 |

* cited by examiner

*Primary Examiner* — Christopher E Leiby
(74) *Attorney, Agent, or Firm* — F. Chau & Associates, LLC (57) ABSTRACT

A display apparatus includes a display panel that displays an image using a first light, a light guide part positioned at a front side of the display panel, a backlight unit, an image information collecting part, and a processing part. The light guide part emits a second light different from the first light and guide the second light, and the backlight unit is positioned at a rear side of the display panel to provide the first light to the display panel. The image information collecting part photographs the light emitted from the light guide part to output image information. The processing part processes the image information to generate a coordinate value of a position at which an object provided on the light guide plate is positioned.

20 Claims, 7 Drawing Sheets

Fig. 7 ures, thereby 65 tus according to an exemplary embodiment of the present
DISPLAY APPARATUS

CROSS-REFERENCE TO RELATED APPLICATION

This application claims priority to Korean Patent Application No. 10-2010-0135625 filed on Dec. 27, 2010, the disclosure of which is hereby incorporated by reference herein in its entirety.

BACKGROUND

1. Technical Field

The present disclosure relates to a display apparatus. More particularly, the present disclosure relates to a display apparatus capable of improving a display quality and accurately sensing a touch position.

2. Description of the Related Art

As a touch panel may be readily operated by touching a screen thereof, touch panels are being widely applied to various electronic devices, such as, for example, a personal digital assistant (PDA), a liquid crystal display (LCD), a cathode ray tube (CRT), and also to various fields, such as, for example, engineering, information technology, economics and finance, government and public offices.

The touch panel may be classified into, for example, a resistive type touch panel, a capacitive touch panel, an ultrasonic wave touch panel, or an infrared type touch panel, according to its touch recognition method.

SUMMARY

Exemplary embodiments of the present invention provide a display apparatus capable of improving a display quality and accurately sensing a touch position.

According to exemplary embodiments, a display apparatus includes a display panel that displays an image using a first light, a light guide part positioned at a front side of the display panel to emit a second light different from the first light and guide the second light, a backlight unit positioned at a rear side of the display panel to provide the first light to the display panel, an image information collecting part that photographs the second light emitted from the light guide part to output an image information, and a processing part that processes the image information to generate a coordinate value of a position at which an object provided on the light guide plate is positioned.

The backlight unit includes a plurality of first light sources that emit the first light and a diffusion plate disposed between the display panel and the first light sources to diffuse the first light emitted from the first light sources. The diffusion plate is provided with a plurality of openings formed therethrough.

The image information collecting part includes a plurality of lenses that receive the second light emitted from the light guide plate, a plurality of optical fiber groups that guide the second light provided through the lenses, and at least one camera disposed below the diffusion plate to photograph the second light guided by the optical fiber groups and output the image information. The lenses are provided to correspond to the openings in one-to-one correspondence and ends of the optical fiber groups are accommodated in the openings, respectively.

According to the above, when the display apparatus employs a wide-angle lens, a size of a sensing area that is photographed by one infrared light camera increases, thereby reducing a number of the infrared light cameras in the display panel without varying the size of the display panel.

In addition, since the infrared light camera photographs the infrared light guided by the optical fiber groups without directly photographing the light guide plate, the camera may be prevented from being perceived through the image displayed on the display panel and the accuracy of the image information obtained by the camera may be increased.

According to exemplary embodiments, a display apparatus includes a display panel that displays an image using a visible light, a light guide part positioned at a front side of the display panel. The light guide part includes a plurality of an infrared light emitting devices to emit an infrared light and a light guide plate to guide the infrared light emitted from the infrared light emitting devices. In addition, the light guide plate is divided into a first sensing area, a second sensing area, a third sensing area, a fourth sensing area, a fifth sensing area and a sixth sensing area.

The display apparatus further includes a backlight unit positioned at a rear side of the display panel to provide the visible light to the display panel, an image information collecting part that photographs the infrared light emitted from the light emitting devices of the light guide part to output an image information and a processing part that processes the image information to generate a coordinate value of a position at which an object provided on the light guide plate is positioned.

The backlight unit includes a plurality of first light sources that emit the visible light and a diffusion plate disposed between the display panel and the first light sources to diffuse the visible emitted from the first light sources and a transmission plate disposed between the display panel and the diffusion plate to support the display panel. The diffusion plate being provided with a plurality of openings formed therethrough.

The image information collecting part includes a plurality of lenses that receive the infrared light emitted from the light guide plate, with the lenses being provided to correspond to the openings in the diffusion plate in one-to-one correspondence and each of the lenses includes a first wide-angle lens, a second wide-angle lens, a third wide-angle lens, a fourth wide-angle lens, a fifth wide-angle lens and a sixth wide-angle lens respectively positioned at a center of the first to sixth sensing areas and adapted to receive the infrared light passing through the first to sixth sensing areas and out of a lower portion of the light guide plate.

The display apparatus further includes a plurality of optical fiber groups that guide the infrared light provided through the lenses and at least one camera disposed below the diffusion plate to photograph the infrared light guided by the optical fiber groups and output the image information. Ends of the optical fiber groups being accommodated in the openings, respectively.

BRIEF DESCRIPTION OF THE DRAWINGS

Exemplary embodiments of the present invention can be understood in more detail from the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout.

Hereinafter, the embodiments of the present invention will be explained in further detail with reference to the accompanying drawings.

Figure 1:
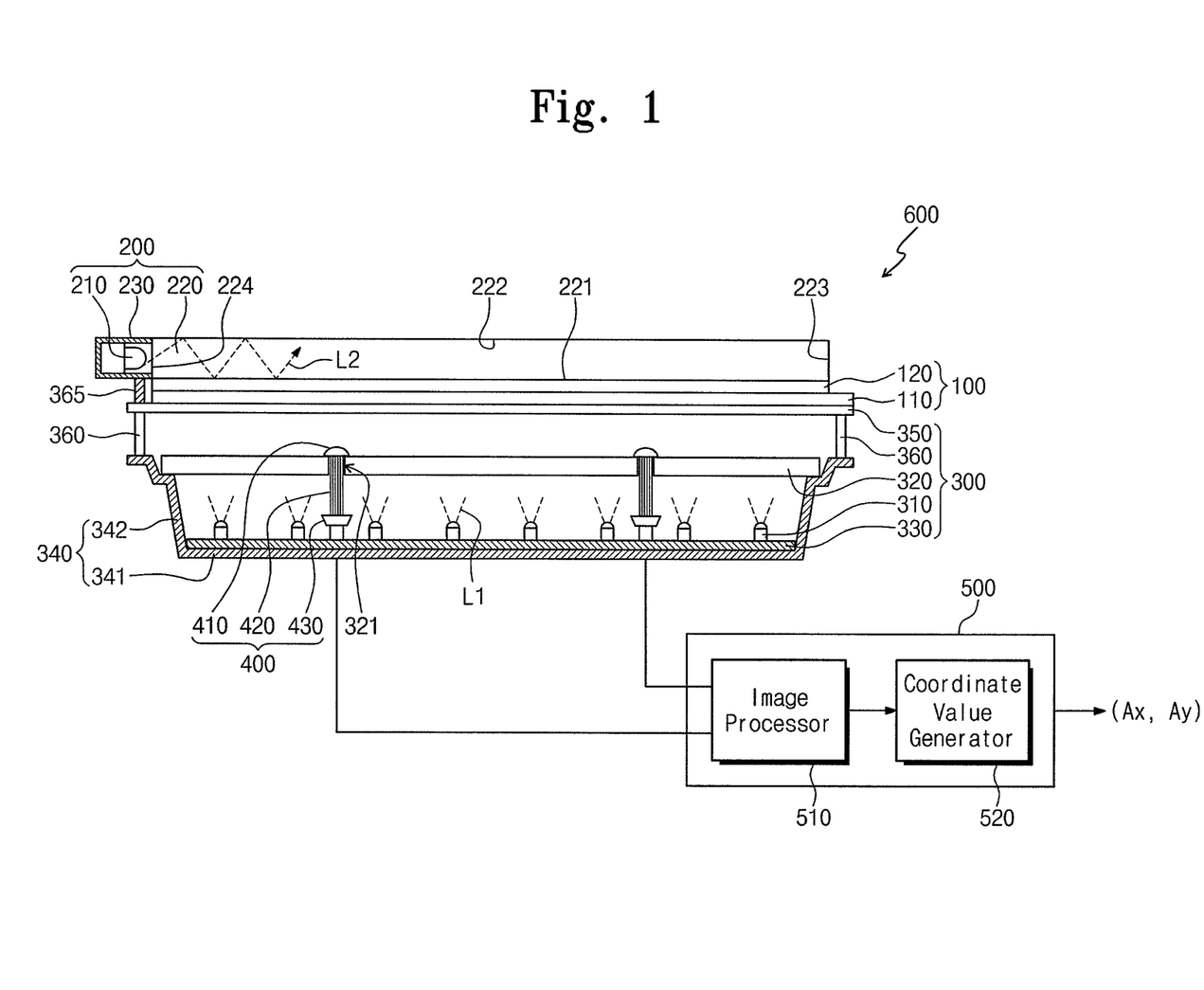
FIG. 1 is a cross-sectional view showing a display apparatus according to an exemplary embodiment of the present invention.
Figure 2:
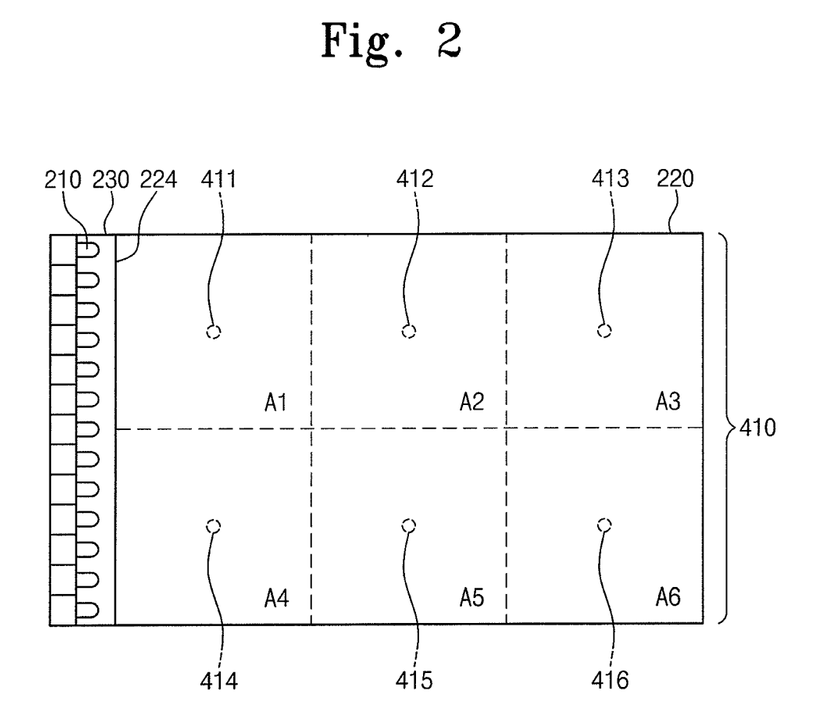
FIG. 2 is a plan view showing a light guide part of FIG. 1.

FIG. 1 is a cross-sectional view showing a display apparatus according to an exemplary embodiment of the present invention and FIG. 2 is a plan view showing a light guide part of FIG. 1.

Referring to FIG. 1, a display apparatus 600 includes a display panel 100 to display an image, a light guide part 200 positioned at a front side of the display panel 100 to emit an infrared light L2 and to guide the infrared light L2, and a backlight unit 300 positioned at a rear side of the display panel 100 to provide a visible light L1 to the display panel 100.

The display panel 100 includes a lower substrate 110 and an upper substrate 120 coupled with the lower substrate 110. The display panel 100 may be various display panels such as, for example, a liquid crystal display panel, an electrophoretic display panel, etc. In the present exemplary embodiment, the liquid crystal display panel will be described as a representative example for the display panel 100.

Although not shown in FIGS. 1 and 2, the lower substrate 110 includes a plurality of data lines, a plurality of gate lines, and a plurality of pixels. Each pixel may include a thin film transistor and a pixel electrode. The thin film transistor includes a first electrode connected to a corresponding gate line of the gate lines, a second electrode connected to a corresponding data line of the data lines, and a third electrode connected to the pixel electrode.

The upper substrate 120 includes a color filter, a common electrode, and a black matrix. At least one of the color filter, the common electrode, or the black matrix may be formed on the lower substrate 110. In addition, a liquid crystal layer (not shown) may be provided between the lower substrate 110 and the upper substrate 120.

The thin film transistor provides an image signal from the corresponding data line to the pixel electrode in response to a gate pulse from the corresponding gate line. The pixel electrode, the liquid crystal layer, and the common electrode form a liquid crystal capacitor. In addition, each pixel may further include a storage capacitor to maintain the image signal charged in the liquid crystal capacitor until a next image signal is applied through the corresponding data line.

However, the display panel 100 is not limited to the above construction. For example, in some exemplary embodiments, a black matrix may be omitted from the display panel 100. In addition, in some exemplary embodiments, the display panel 100 may further include, for example, an alignment layer formed on at least one of the lower substrate 110 and the upper substrate 120 for aligning liquid crystal molecules in the liquid crystal layer in a desired direction.

The light guide part 200 includes an infrared light emitting device 210 to emit the infrared light L2 and a light guide plate 220 to guide the infrared light L2 emitted from the infrared light emitting device 210. The infrared light emitting device 210 may be, for example, an infrared light emitting diode.

The light guide plate 220 is disposed on the display panel 100 to cover the front surface of the display panel 100. The light guide plate 220 includes a lower surface 221 facing the display panel 100, an upper surface 222 opposite to the lower surface 221, and side surfaces 223 connecting the lower surface 221 and the upper surface 222.

At least one side surface of the side surfaces 223 faces the infrared light emitting device 210 to serve as an incident surface 224 to which the infrared light L2 emitted from the infrared light emitting device 210 is incident. As shown in FIG. 2, the infrared light emitting device 210 is provided in a plural number, and the infrared light emitting devices 210 are arranged in one line along the incident surface 224.

In FIGS. 1 and 2, the infrared light emitting devices 210 are positioned adjacent to one of the side surfaces 223, but they should not be limited thereto or thereby. That is, the infrared light emitting devices 210 may be positioned, for example, adjacent to two opposite side surfaces or four side surfaces of the light guide plate 220.

As an example, the light guide plate 220 may be formed of plastic, resin, glass, or other transparent material such as polymethylmethacrylate (PMMA), polycarbonate, polyacrylate, silicone, quartz and epoxy.

Meanwhile, the light guide part 200 may further include a cover 230 to cover the infrared light emitting device 210 and to reflect the infrared light L2 emitted from the infrared light emitting device 210 toward the light guide plate 220. The cover 230 has an opening portion to allow the infrared light L2 emitted from the infrared light device 210 to be provided to the light guide plate 220.

The infrared light L2 incident into the light guide plate 220 is totally reflected. The total reflection means that lights are totally reflected at a boundary region between two media when an incident angle exceeds a specific angle while the lights are incident into a medium having a relatively small refractive index from a medium having a relatively large refractive index. Therefore, since the light guide plate 220 has the refractive index higher than that of air, the infrared light L2 incident into the light guide plate 220 is totally reflected.

However, when an object, e.g. a user's finger (See, e.g., FIG. 3) is disposed on the light guide plate 220, the infrared light L2 reaches the object. Thus, the infrared light L2 is reflected to a lower portion of the light guide plate 220. Accordingly, the region at which the object is positioned is brightly perceived when the light guide plate 220 is observed using an infrared camera at the lower portion of the light guide plate 220.

In other words, when touched by an external object, the light guide plate 220 changes a traveling direction of the infrared light L2 by Fourier transform infrared (FTIR) therein. The FTIR means that the infrared light L2, which travels through the light guide plate 220 while being totally reflected, changes its traveling direction toward the lower portion of the light guide plate 220 due to the touch event of the object.

The backlight unit 300 includes a plurality of light sources 310 emitting the visible light L1 having a visible light wavelength, a circuit substrate 330 on which the light sources 310 are mounted, and a diffusion plate 320 diffusing the visible light L1.

Each of the light sources 310 may include a light emitting diode. In addition, each of the light sources 310 may emit a white light and include three groups emitting a red light, a green light, and a blue light. Further, each of the light sources 310 may be a fluorescent lamp, such as, for example, a cold cathode fluorescent lamp (CCFL), a hot cathode fluorescent lamp (HCFL), an external electrode fluorescent lamp (EEFL).

As an example, each of the light sources 310 includes a white light emitting diode that emits the white light.

The diffusion plate 320 is disposed between the display panel 100 and the light sources 310 to diffuse the visible light L1 generated by the light sources 310. The display panel 100 receives the diffused visible light L1 to display the image, thereby increasing a brightness uniformity of the display apparatus 600.

The backlight unit 300 further includes a bottom chassis 340 to accommodate the light sources 310, the circuit substrate 330, and the diffusion plate 320.

The bottom chassis 340 includes a bottom 341 and a sidewall 342 extended from the bottom 341 and accommodates the light sources 310 and the circuit substrate 330 in a receiving space defined by the bottom 341 and the sidewall 342. The bottom chassis 340 may include a step portion formed on the sidewall 342 to support the diffusion plate 320.

The backlight unit 300 further includes a transparent transmission plate 350 and a supporter 360 that supports the transmission plate 350. The transmission plate 350 is disposed below the display panel 100 to support the display panel 100. That is, the transmission plate 350 supports the display panel 100 such that the display panel may be prevented from being bent when the light guide plate 220 is touched. The transmission plate 350 is supported by the supporter 360 disposed between the transmission 122 and the bottom chassis 340. The supporter 360 spaces the transmission plate 350 from the diffusion plate 320 by a predetermined distance.

As shown in FIG. 1, the display apparatus 600 may further include a spacer 365 disposed between the cover 230 and the transmission plate 350 to support the cover 230.

In addition, the display apparatus 600 further includes an image information collecting part 400 that photographs the light guide part 200 to output image information and a processing part 500 that processes the image information to generate a coordinate value of a position at which the object is positioned.

The image information collecting part 400 includes a plurality of wide-angle lenses 410, a plurality of optical fiber groups 420, and a plurality of infrared light cameras 430.

Meanwhile, the diffusion plate 320 is provided with a plurality of openings 321. The wide-angle lenses 410 are positioned corresponding to the openings 321 in one-to-one correspondence to receive the infrared light L2 emitted from the light guide part 200.

In FIG. 2, six wide-angle lenses 410 are shown in an exemplary embodiment of the present invention. As shown in FIG. 2, the wide-angle lenses 410 may include first to sixth wide-angle lenses 411 to 416. In this case, the light guide plate 220 is divided into first to sixth sensing areas A1 to A6 and the first to sixth wide-angle lenses 411 to 416 are provided in the first to sixth sensing areas A1 to A6, respectively.

The first to sixth wide-angle lenses 411 to 416 are respectively positioned at a center of the first to sixth sensing areas A1 to A6 to receive the infrared light L2 passing through the first to sixth sensing areas A1 to A6.

The optical fiber groups 420 are accommodated in the openings 321 formed through the diffusion plate 320. Each of the optical fiber groups 420 includes a plurality of optical fibers of which ends thereof are accommodated in the corresponding opening of the openings 321. The optical fibers included in each of the optical fiber groups 420 guides the light received through the corresponding wide-angle lens of the wide-angle lenses 411 to 416.

The infrared light cameras 430 are disposed below the diffusion plate 320 and photograph the light guided by the optical fiber groups 420 to output the image information.

As an example, the infrared light cameras 430 may be mounted on the circuit substrate 330. For example, the light sources 310 are spaced apart from each other and arranged in a matrix configuration. In this case, the infrared light cameras 430 are positioned between the light sources 310.

The processing part 500 includes an image processor 510 that receives the image information from the infrared light cameras 430 and processes the image information to output electrical signals and a coordinate value generator 520 that generates a coordinate value Ax and Ay of the position at which the object is positioned based on the electrical signals. The processing part 500 may transmit the coordinate value Ax and Ay to a controller (not shown) that controls the operation of the display apparatus 600 based on the coordinate value Ax and Ay.

Figure 3:
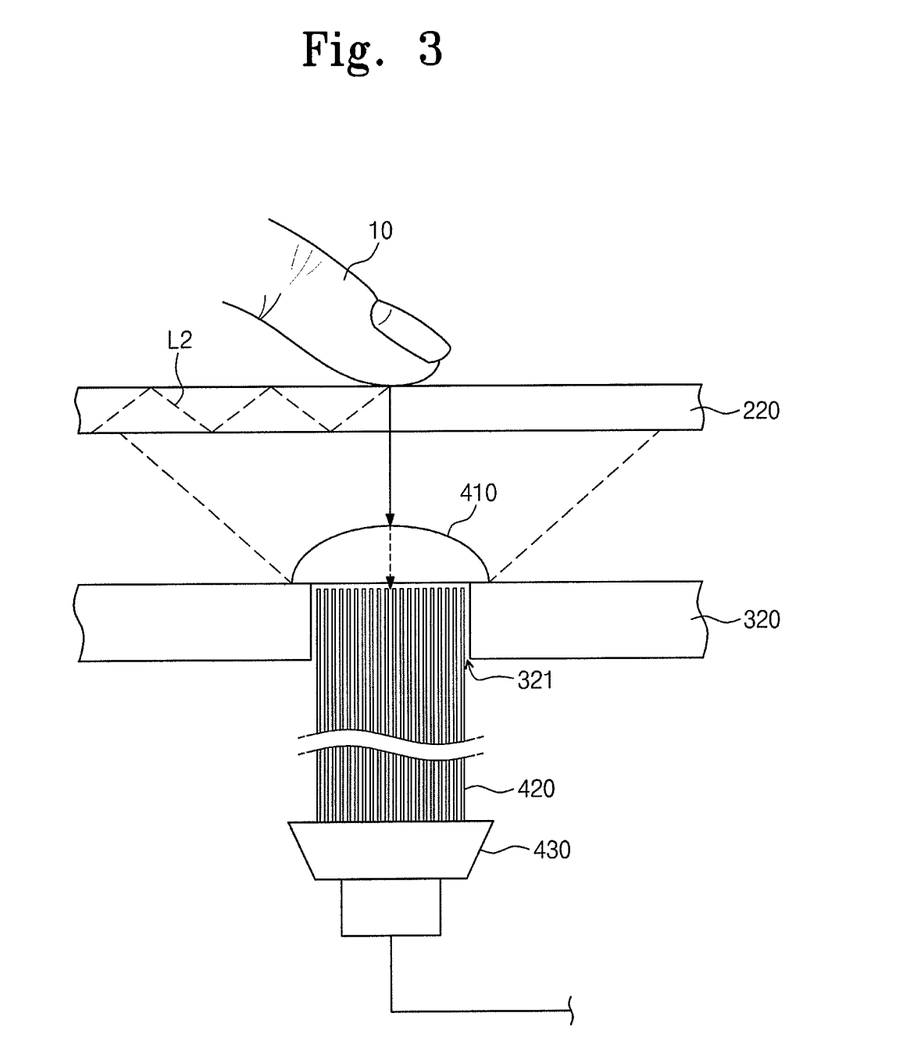
FIG. 3 is a partially enlarged view of the display apparatus of FIG. 1.

FIG. 3 is a partially enlarged view of the display apparatus of FIG. 1.

Referring to FIG. 3, when a user's finger 10 touches the light guide plate 220, the infrared light L2 that is totally reflected in the light guide plate 220 is reflected by the finger 10 toward the lower portion of the light guide plate 220.

The infrared light L2, which is reflected by the finger 10 and exits from the light guide plate 220, is provided to the wide-angle lens 410 corresponding to the sensing area in which the touch event actually occurs.

The wide-angle lenses 410 is disposed on the diffusion plate 320 and has, for example, a convex shape with respect to the upper surface of the diffusion plate 320. Since the wide-angle lenses 410 has a focal length shorter than that of a conventional lens, the wide-angle lens 410 may receive the infrared light L2 through a relatively large area compared to that of the conventional lens.

When the wide-angle lenses 410 receive the infrared light L2, the infrared light L2 is guided to the infrared light camera 430 by the optical fiber group 420 corresponding to the wide-angle lenses 410.

Accordingly, the region at which the finger 10 is positioned is brightly represented on the screen photographed by the infrared light cameras 430. As described above, the image information collected by the infrared light cameras 430 is transmitted to the processing part 500.

As described above, the size of the sensing area that may be photographed by one infrared light camera 430 is increased by using the wide-angle lenses 410. As a result, the number of the infrared light cameras 430 may be reduced without varying the size of the display panel 100.

According to an exemplary embodiment, the infrared light cameras 430 photographs the infrared light L2 guided by the corresponding optical fiber groups 420 without directly photographing the light guide plate 220. Thus, the infrared light camera 430 does not need to be positioned adjacent to the openings 321 of the diffusion plate 320. As a result, the infrared light cameras 430 may be prevented from being perceived through the image displayed on the display panel 100, thereby increasing the accuracy of the image information obtained by the infrared light cameras 430.

Figure 4:
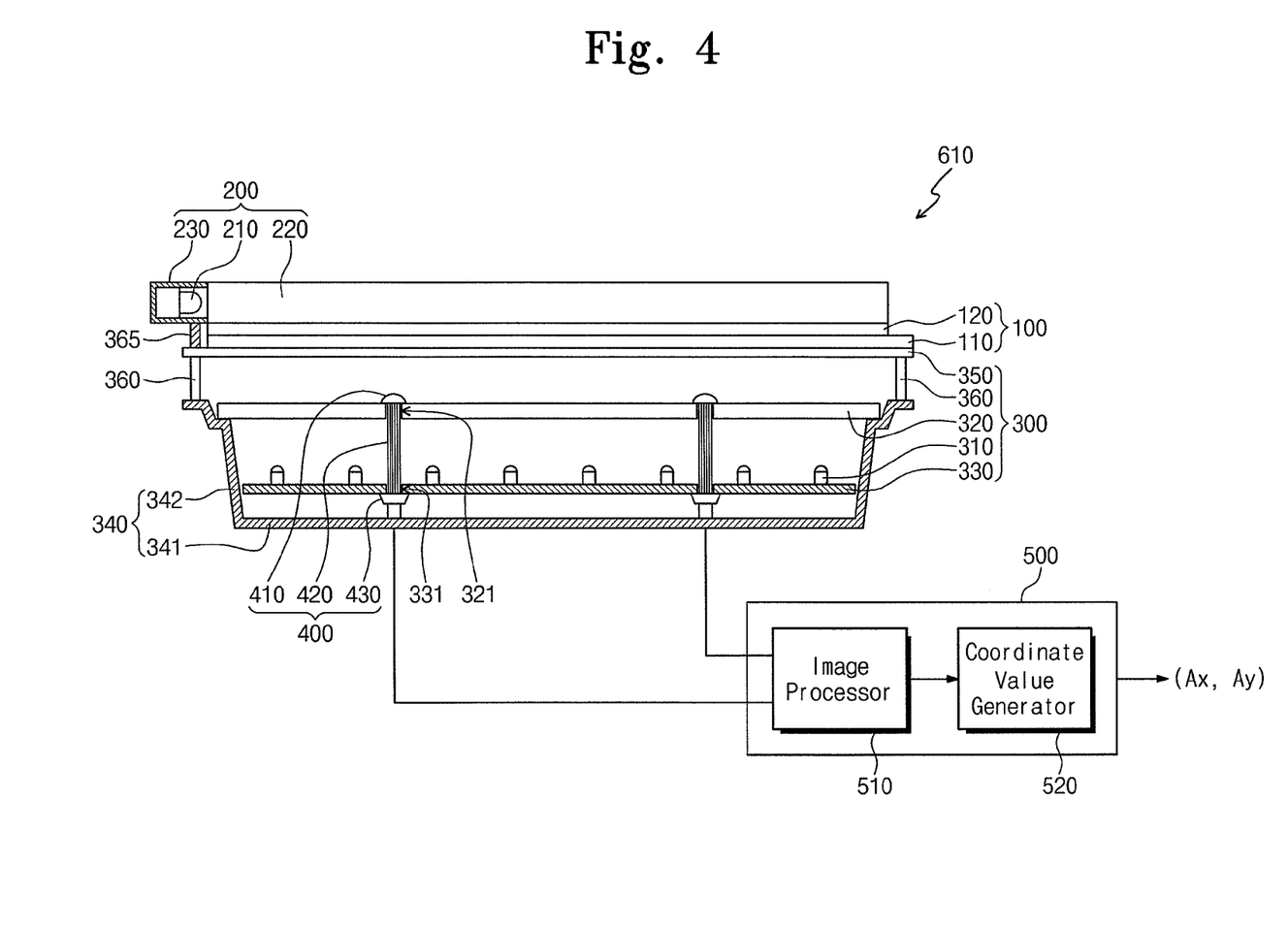
FIG. 4 is a cross-sectional view showing a display apparatus according to an exemplary embodiment of the present invention.

FIG. 4 is a cross-sectional view showing a display apparatus according to another exemplary embodiment of the present invention. In FIG. 4, the same reference numerals denote the same elements in FIG. 1, and thus detailed descriptions of the same elements will be omitted.

Referring to FIG. 4, a display apparatus 610 according to another exemplary embodiment has a similar structure to that of the display apparatus 600 shown in FIG. 1 except that in FIG. 4 the infrared light cameras 430 are disposed between the circuit substrate 330 and the bottom chassis 340.

For example, the circuit substrate 330 includes a plurality of thru-holes 331 formed therethrough to correspond to the openings 321 foamed through the diffusion plate 320 in one-to-one correspondence. The infrared light cameras 430 are exposed through the thru-holes 331, respectively.

Each of the optical fiber groups 420 includes one end accommodated in the corresponding opening 321 and the other end disposed in a corresponding thru-hole 331 to pass through the thru-hole 331.

As described above, when the infrared light cameras 430 are disposed below the circuit substrate 330, the infrared light cameras 430 may be prevented from being perceived through the image displayed on the display apparatus 610.

Figure 5:
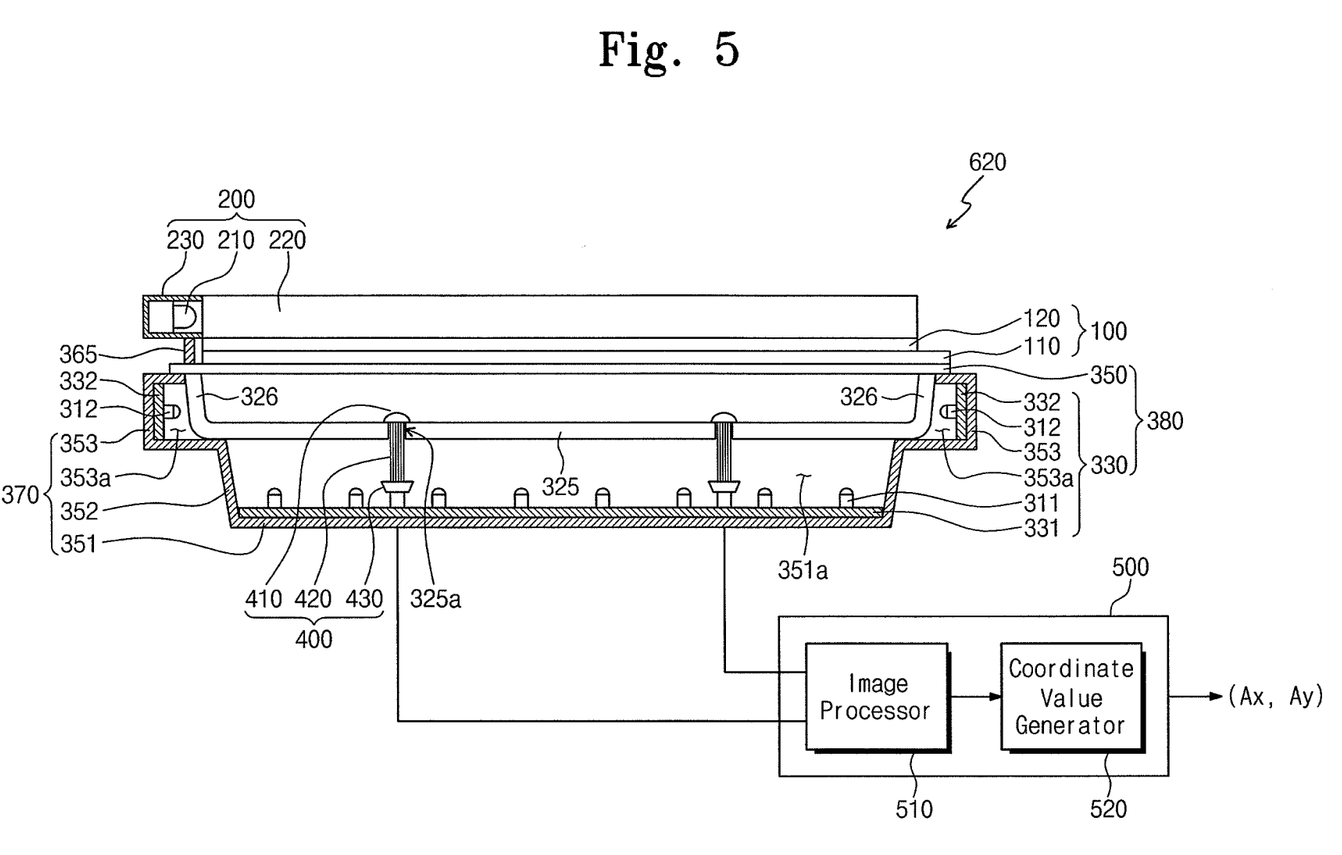
FIG. 5 is a cross-sectional view showing a display apparatus according to an exemplary embodiment of the present invention.

FIG. 5 is a cross-sectional view showing a display apparatus according to another exemplary embodiment of the present invention.

Referring to FIG. 5, a display apparatus 620 according to another exemplary embodiment includes a display panel 100, a light guide part 200, a backlight unit 380, an image information collecting part 400, and a processing part 500.

The backlight unit 380 includes the light sources 310, the circuit substrate 330, a diffusion plate 320, and the bottom chassis 370.

The diffusion plate 320 includes a first diffusion portion 325 substantially parallel to the upper surface of the display panel 100 and a second diffusion portion 326 extended from the first diffusion portion 325 to a direction vertical to the upper surface of the display panel 100. A portion at which the first diffusion portion 325 meets the second diffusion portion 326 has, for example, a round shape. As an example, the diffusion plate 320 has a substantially U-shape in a cross-sectional view.

The first diffusion portion 325 includes a plurality of openings 325a, and a plurality of wide-angle lenses 410 may be provided corresponding to the openings 325a in one-to-one correspondence.

The light sources 310 are divided into a first light source group 311 positioned adjacent to the first diffusion portion 325 and a second light source group 312 positioned adjacent to the second diffusion portion 326.

The circuit substrate 330 includes a first circuit substrate 331 on which the first light source group 311 is mounted and a second circuit substrate 332 on which the second light source group 312 is mounted.

The bottom chassis 370 includes a bottom 351 and a sidewall 352 extended from the bottom 351 and receives the first light source group 311 and the first circuit substrate 331 in a first receiving space 351a defined by the bottom 351 and the sidewall 352.

An extended portion 352 extended from an upper end of the sidewall 342 provides a second receiving space 353a with the second diffusion portion 326. The second light source group 312 and the second circuit substrate 332 are accommodated in the second receiving space 353a.

As described above, when the portion at which the first diffusion portion 325 is connected to the second diffusion portion 326 has a round shape, a corner portion between the bottom 351 of the bottom chassis 370 and the sidewall 352 may be prevented from being perceived as a dark line defect on the image displayed on the display apparatus 620.

Figure 6:
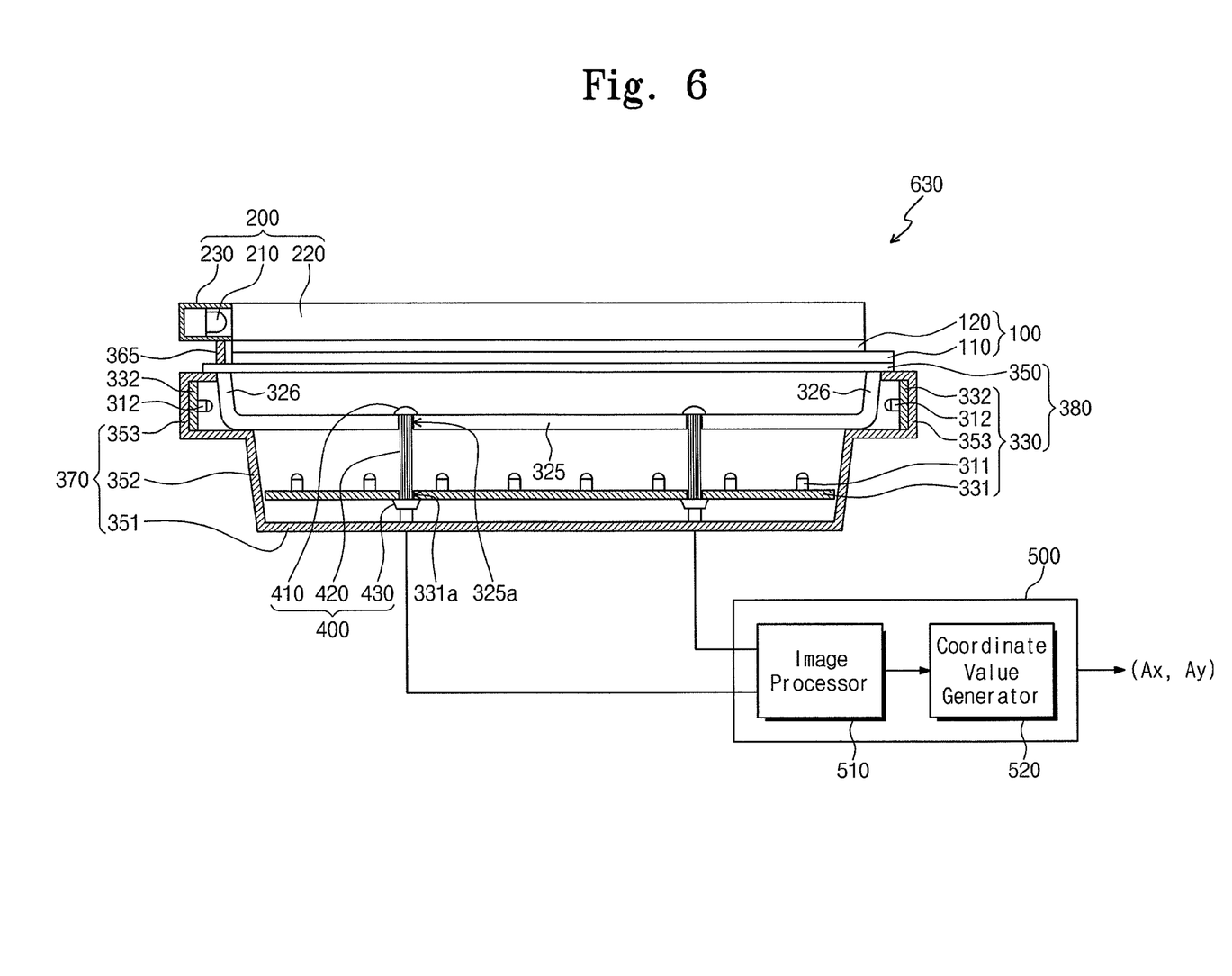
FIG. 6 is a cross-sectional view showing a display apparatus according to an exemplary embodiment of the present invention.

FIG. 6 is a cross-sectional view showing a display apparatus according to another exemplary embodiment of the present invention. In FIG. 6, the same reference numerals denote the same elements in FIG. 5, and thus detailed descriptions of the same elements will be omitted.

Referring to FIG. 6, a display apparatus 630 according to another exemplary embodiment has a similar structure to that of the display apparatus 620 shown in FIG. 5 except that in FIG. 6 the infrared light cameras 430 are disposed between the first circuit substrate 331 and the bottom chassis 370.

For example, the first circuit substrate 331 includes a plurality of thru-holes 331a formed therethrough to correspond to the openings 325a formed through the first diffusion portion 325 in one-to-one correspondence. The infrared light cameras 430 are exposed through the thru-holes 331a, respectively.

Each of the optical fiber groups 420 includes one end accommodated in the corresponding opening 325a and the other end disposed in a corresponding thru-hole 331a to pass through the thru-hole 331a.

As described above, when the infrared light cameras 430 are disposed below the first circuit substrate 331, the infrared light cameras 430 may be prevented from being perceived through the image displayed on the display apparatus 630.

Figure 7:
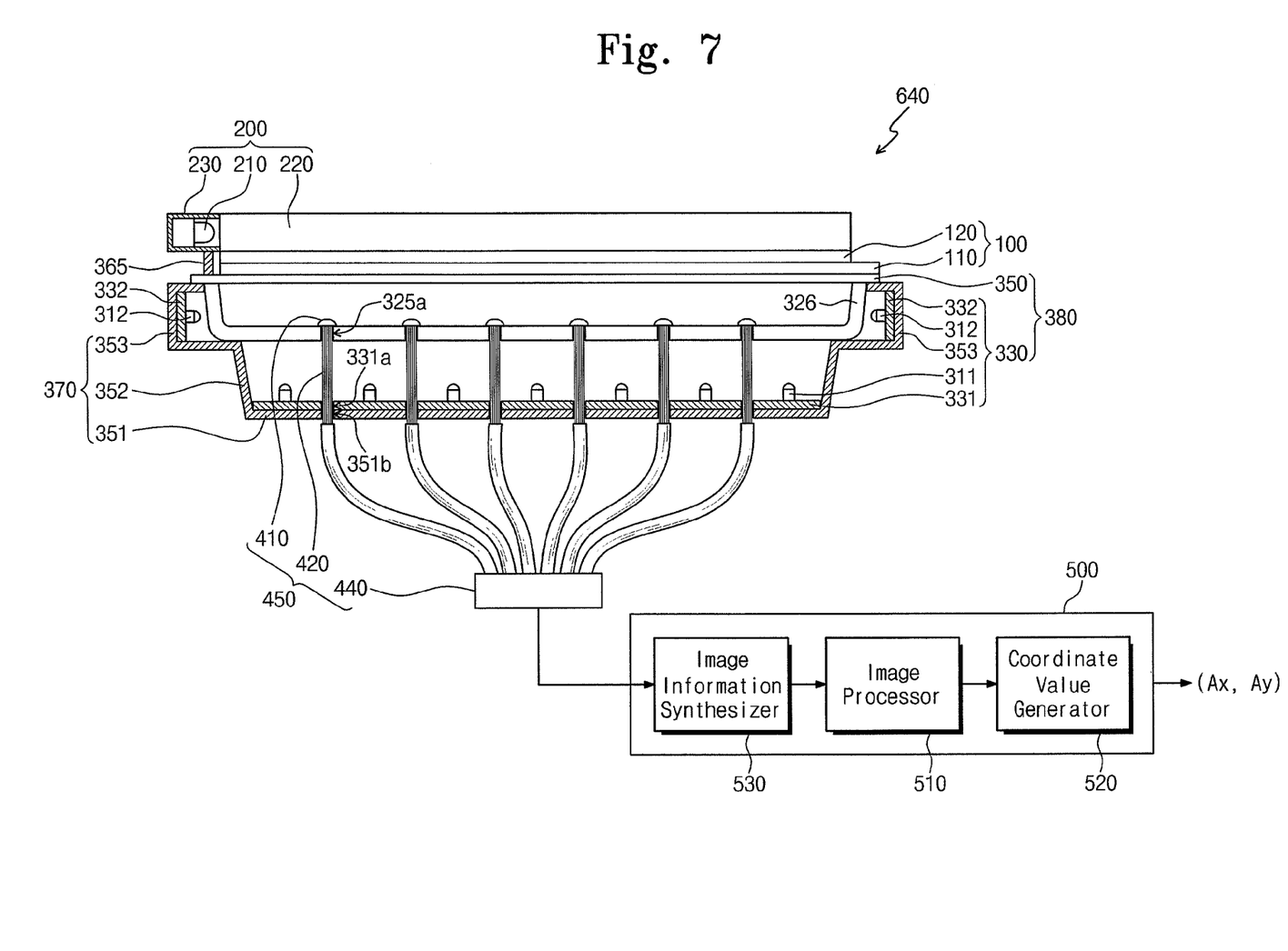
FIG. 7 is a cross-sectional view showing a display apparatus according to an exemplary embodiment of the present invention.

FIG. 7 is a cross-sectional view showing a display apparatus according to another exemplary embodiment of the present invention.

Referring to FIG. 7, a display apparatus 640 according to another exemplary embodiment includes one infrared light camera 440 connected to a plurality of optical fiber groups. For example, the image information collecting part 400 shown in FIGS. 1, 4, 5, and 6 includes the plural infrared light cameras 430, but an image information collecting part 450 shown in FIG. 7 includes one infrared light camera 440 connected to the optical fiber groups 420.

In this case, the infrared light camera 440 is positioned outside the bottom chassis 370. The bottom chassis 370 includes a bottom 351 through which a plurality of withdrawal holes 351b are formed to withdraw the optical fiber groups 420 outside the bottom chassis 370.

The infrared light camera 440 independently photographs the infrared light L2 guided by each optical fiber group 420 and provides the photographed image information to the processing part 500.

The processing part 500 includes an image information synthesizer 530, an image processor 510, and a coordinate value generator 520. The image information synthesizer 530 synthesizes the image information photographed by the infrared light camera 440 to generate an integrated image information. The image processor 510 converts the integrated image information to an electrical signal, and the coordinate value generator 520 generates a coordinate value of a position at which the object is positioned.

As described above, when the infrared light L2 exiting through the sensing areas A1 to A6 is guided to outside of the bottom chassis 370 by using the optical fiber groups 420, the infrared light camera 440 does not need to be accommodated in the receiving space of the bottom chassis 370. Thus, the infrared light camera 440 may be prevented from being perceived on the display panel 100, thereby reducing the whole size of the display apparatus 640 by the size of the infrared light camera 440 and also simplifying the assembly of the display apparatus 640.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a display panel that displays an image using a first light;
   a light guide part positioned at a front side of the display panel to emit a second light different from the first light and guide the second light;
   a backlight unit positioned at a rear side of the display panel to provide the first light to the display panel;
   an image information collecting part that photographs the second light emitted from the light guide part to output an image information; and
   a processing part that processes the image information to generate a coordinate value of a position at which an object provided on the light guide part is positioned, wherein the backlight unit comprises
   a plurality of first light sources that emit the first light; and
   a diffusion plate disposed between the display panel and the first light sources to diffuse the first light emitted from the first light sources, the diffusion plate being provided with a plurality of openings formed therethrough,
   wherein the image information collecting part comprises:
   a plurality of lenses that receive the second light emitted from the light guide plate, the lenses being provided directly on an upper surface of the diffusion plate to correspond to the openings in one-to-one correspondence;
   a plurality of optical fiber groups that guide the second light provided through the lenses, ends of the optical fiber groups being accommodated in the openings, respectively; and
   at least one camera disposed below the diffusion plate to photograph the second light guided by the optical fiber groups and output the image information, wherein the optical fiber groups are disposed between the lens and the camera,
   wherein the plurality of optical fiber groups is configured to carry the second light from the plurality of lenses to the at least one camera while bypassing the diffusion plate,
   wherein the diffusion plate comprises a first diffusion portion substantially parallel to the display panel and being provided with the openings and a second diffusion portion extended from the first diffusion portion to a direction vertical to the display panel, and a portion at which the first diffusion s ort on meets the second diffusion portion has a round shape, and
   wherein the first light sources are divided into a first light source group positioned adjacent to the first diffusion portion and a second light source group positioned adjacent to the second diffusion portion.

2. The display apparatus of claim 1, wherein each of the lenses is disposed on the diffusion plate and is a wide-angle lens having a convex shape with respect to an upper surface of the diffusion plate.

3. The display apparatus of claim 1, wherein the light guide part comprises:
   a second light source that emits the second light; and
   a light guide plate that receives the second light through a side surface thereof to totally reflect the second light.

4. The display apparatus of claim 3, wherein the second light source is an infrared light emitting diode that emits the second light having an infrared light wavelength.

5. The display apparatus of claim 1, wherein each of the first light sources comprises a light emitting diode, and the backlight unit further comprises a circuit substrate on which the first light sources are mounted.

6. The display apparatus of claim 5, wherein the camera is provided in a plural number and the cameras correspond to the openings in one-to-one correspondence.

7. The display apparatus of claim 6, wherein the cameras are disposed between the first light sources and disposed between the diffusion plate and the circuit substrate.

8. The display apparatus of claim 6, wherein the cameras are disposed below the circuit substrate and the circuit substrate is provided with a plurality of thru-holes respectively corresponding to the cameras.

9. The display apparatus of claim 6, wherein the processing part comprises: an image processor that receives the image information from the cameras to convert the image information to an electrical signal; and
   a coordinate value generator that generates the coordinate value of the position at which the object is positioned.

10. The display apparatus of claim 5, wherein the camera is disposed below the circuit substrate, the circuit substrate is provided with a plurality thru-holes respectively corresponding to the openings, and the optical fiber groups pass through the thru-holes, respectively.

11. The display apparatus of claim 10, wherein the camera photographs the second light guided by the optical fiber groups to output image information photographed by the camera to the processing part, and the processing part comprises:
    an image information synthesizer that synthesizes the image information photographed into an integrated image information;
    an image processor that receives the integrated image information to convert the integrated image information to an electrical signal; and
    a coordinate value generator that generates the coordinate value of the position at which the object is positioned based on the electrical signal.

12. The display apparatus of claim 1, wherein each of the first light source group and the second light source group comprises light emitting diodes as light sources thereof, and the backlight unit further comprises a first circuit substrate on which the first light source group is mounted and a second circuit substrate on which the second light source group is mounted.

13. The display apparatus of claim 12, wherein the camera is provided in a plural number and the cameras are provided to correspond to the openings, respectively.

14. The display apparatus of claim 13, wherein the cameras are disposed between the first diffusion portion and the first circuit substrate.

15. The display apparatus of claim 13, wherein the cameras are disposed below the first circuit substrate and the first circuit substrate is provided with a plurality of thru-holes respectively corresponding to the cameras.

16. The display apparatus of claim 12, wherein the camera is disposed below the first circuit substrate, the first circuit substrate is provided with a plurality thru-holes respectively corresponding to the openings, and the optical fiber groups pass through the thru-holes, respectively.

17. The display apparatus of claim 12, wherein the backlight unit further comprises a receiving space to accommodate the first light sources, the diffusion plate, the first circuit substrate, the second circuit substrate, and the camera therein.

18. The display apparatus of claim 1, wherein the backlight unit further comprises a transparent transmission plate disposed between the diffusion plate and the display panel and supporting the display panel on an upper surface thereof, and wherein the transparent transmission plate is configured to prevent bending of the display panel when a light guiding portion of the light guide part is touched.

19. The display apparatus of claim 1, wherein the light guide part includes an infrared light emitting device to emit the second light and a light guide plate to guide the second light emitted from the infrared light emitting device, and wherein the display apparatus further includes a cover which covers the infrared light emitting device and reflects the second light emitted from the infrared light emitting device toward the light guide plate and wherein the cover has an opening portion configured to allow the second light emitted from the infrared light emitting device to be provided to the light guide plate.

20. The display apparatus of claim 19, further comprising a spacer disposed between the cover and the transparent transmission plate to support the cover, and a supporter that supports the transparent transmission plate thereon and which spaces the transparent transmission plate from the diffusion plate by a predetermined distance.

* * * * *